(12) United States Patent
Magargee et al.

(10) Patent No.: US 7,857,896 B2
(45) Date of Patent: Dec. 28, 2010

(54) MOISTURE ABSORBING PRODUCT FOR USE IN CONTAINERS

(75) Inventors: Ronald J. Magargee, Brandon, MS (US); Genevieve Kuhn, Albuquerque, NM (US); Stefan O. Dick, Weichering (DE); Justin A Mueller, St. Louis, MO (US); Mark A Florez, Los Lunas, NM (US); Joaquin Teixeira, Los Lunas, NM (US)

(73) Assignee: Sud-Chemie Inc., Louisville, KY (US)

( * ) Notice: Subject to any disclaimer, the term of this patent is extended or adjusted under 35 U.S.C. 154(b) by 275 days.

(21) Appl. No.: 12/282,197

(22) PCT Filed: Mar. 15, 2007

(86) PCT No.: PCT/US2007/006462

§ 371 (c)(1),
(2), (4) Date: Sep. 9, 2008

(87) PCT Pub. No.: WO2007/109063

PCT Pub. Date: Sep. 27, 2007

(65) Prior Publication Data

US 2009/0056361 A1 Mar. 5, 2009

Related U.S. Application Data

(60) Provisional application No. 60/782,507, filed on Mar. 15, 2006.

(51) Int. Cl.
*B01D 53/02* (2006.01)
*B01D 53/26* (2006.01)

(52) U.S. Cl. .......................................... 96/118; 206/204
(58) Field of Classification Search ........... 96/118–121, 96/133, 147, 148; 95/91, 117; 206/204
See application file for complete search history.

(56) References Cited

U.S. PATENT DOCUMENTS

| | | | |
|---|---|---|---|
| 2,554,879 A | | 5/1951 | Race, Jr. |
| 2,581,684 A | * | 1/1952 | McKenzie ................... 96/151 |
| 2,765,046 A | * | 10/1956 | Fritz ........................... 62/271 |
| 4,224,366 A | * | 9/1980 | McCabe, Jr. ................. 428/72 |
| 4,756,726 A | | 7/1988 | Peace |
| 4,913,942 A | | 4/1990 | Jick |
| 4,957,521 A | | 9/1990 | Cullen et al. |
| 5,035,805 A | * | 7/1991 | Freeman et al. ............. 210/689 |
| 5,743,942 A | | 4/1998 | Shelley et al. |

(Continued)

FOREIGN PATENT DOCUMENTS

EP 0793992 A2 9/1997

*Primary Examiner*—Frank M Lawrence
(74) *Attorney, Agent, or Firm*—Scott R. Cox; Sud-Chemie Inc.

(57) ABSTRACT

A moisture absorbing product, particularly for use in containers or railcars, includes a desiccant container including a plurality of separate desiccant holding compartments, each containing a quantity of desiccant material, a support over which the desiccant material is placed, a sheeting material, which substantially covers the desiccant container and which is permeable to gaseous water vapor but substantially impermeable to liquid water, and a strap with hook, secured to or within the support or desiccant container, which strap and hook are useful for hanging the moisture absorbing product within the container or railcar.

18 Claims, 5 Drawing Sheets

U.S. PATENT DOCUMENTS

| | | |
|---|---|---|
| 5,935,304 A | 8/1999 | Shelley et al. |
| 6,217,701 B1 | 4/2001 | Shelley et al. |
| 6,689,197 B2 | 2/2004 | Dick et al. |
| 6,767,521 B1 | 7/2004 | Vogt et al. |
| 6,793,713 B2 * | 9/2004 | Kretsinger et al. ............ 95/117 |
| 2005/0223584 A1 | 10/2005 | Jones et al. |

* cited by examiner

MOISTURE ABSORBING PRODUCT FOR USE IN CONTAINERS

BACKGROUND OF INVENTION

This invention relates to moisture absorbing products. More specifically, this invention relates to moisture absorbing products, which are particularly useful for hanging within shipping containers, such as railroad cars.

Moisture absorbing products which absorb water vapor, liquid water and the like are known in the art. Generally these products are comprised of a water and/or water vapor permeable packaging material formed from fibrous or film products securely sealed at the edges of the packaging material. The packaging material encapsulates a water absorbing material, such as silica gel. The volume of water or water vapor absorbed by these moisture absorbing products is generally determined by the water absorbing capacity of the absorbing material contained within the packaging material.

One type of moisture absorbing product absorbs both water vapor and liquid water by permitting both to pass through the packaging material to contact the water absorbing material. In some circumstances the packaging material for this type of product dissolves when contacted with liquid water to permit the water absorbing material contained therein to contact directly the liquid water.

Another type of moisture absorbing product preferentially absorbs water vapor. The packaging material for this type of moisture absorbing product is chosen to prevent liquid water, which is absorbed within the product by the water absorbing material in the form of water vapor, from being released from the product in the form of liquid water.

There are many common water absorbing materials used with these products. Among the most common are silica gel, calcium sulfate, calcium fluoride, activated charcoal, molecular sieves, lithium chloride, calcium chloride and other such materials. A list of some of these materials is contained, for example, in Kirk-Othmer, *Encyclopedia of Chemical Dictionary*, $2^{nd}$ Edition, Vol. 7, pages 378-398. In addition to the use of a single water absorbing material, such as silica gel, mixtures of different water absorbing materials have also been used.

A common method that is used to ship consumer and commercial products is by use of a shipping container such as a railcar. These shipping containers can hold a significant quantity of consumer or commercial products. However, the atmosphere of these containers sometimes also contains high humidity. To control the level of humidity within these containers, it is often necessary to utilize moisture absorbing products placed within these containers. Further, because of the structure of these containers, there is often a limited availability of space for placement of such moisture absorbing products within the containers.

It is often important that the relative humidity within these containers be maintained within a relatively narrow range during the entire shipping process. By controlling the relative humidity, thereby controlling the dew point, condensation of moisture within the container is prevented, thereby limiting the formation of liquid water.

When moisture absorbing products are placed within such containers, they are designed to absorb water vapor from the surrounding atmosphere. After a predetermined quantity of water vapor is absorbed, the water absorbing products may reach a saturation point and begin to give off liquid water or a liquid water-containing solution, depending on the water absorbing capacity of the moisture absorbing product that is used. It is important that any liquid water or liquid water-containing solution which is generated by these water absorbing products not be released from the water absorbing product into the container as such liquid water or solution can cause damage both to the commercial products being shipped and to the container itself.

Therefore, it is one object of a preferred embodiment of the invention to prepare a new and improved moisture absorbing product which is particularly useful for absorbing moisture that may be present within commercial products being shipped within a container, and within the atmosphere of the container itself during the shipping process without giving off liquid water.

This object and other objects and features of the present inventions will become apparent to those skilled in the art from a consideration of the following detailed description and drawings. The description, along with the accompanying drawings, provides a selected example of the construction of products to illustrate the invention, but does not limit the scope and coverage of the invention that is disclosed herein.

SUMMARY OF THE INVENTION

In accordance with one embodiment of the present invention, there is provided a moisture absorbing product (10), particularly for use in a shipping container or railcar (12), comprising a desiccant container (20) comprising a plurality of desiccant holding compartments (30), each compartment preferably containing a quantity of desiccant material (40), wherein the desiccant material (40) absorbs water vapor, but minimizes the production of liquid water, and wherein the desiccant container (20) is generally formed into a quilt-shape from multiple desiccant compartments, or a single strip of individual desiccant compartments, a moisture absorbing product support (50) over which the quilt-shaped desiccant container (20) is draped, wherein the support (50) is preferably contained partially or wholly within the moisture absorbing product (10), and which support (50) provides structural stability and support for the moisture absorbing product (10) (Depending on the choice of shape and structure of the moisture absorbing product (10), this support may not be necessary.), a sheeting material (60), which substantially covers the desiccant container (20), wherein said sheeting material (60) is permeable to gaseous water, by composition or design, but substantially impermeable to liquid water, and a strap (70), preferably secured to and/or partially placed within the support (50), and/or secured to the desiccant container (20), and/or secured to or placed within the moisture absorbing product (10) separate from the support (50) or the desiccant container (20), wherein at least a portion of the strap (70) is located outside of the desiccant container (20). In a further embodiment the strap (70) is adjustable in length and/or continuous. This strap (70) is useful for hanging the moisture absorbing product (10) within the container (12).

In a further embodiment a hook (80) is preferably attached to, or secured to, or associated with, the strap (70) to assist in hanging the moisture absorbing product (10) within the container (12). In an alternative embodiment the hook may be attached directly to the desiccant container (20) or covering material (90) for the desiccant container (20).

In a further embodiment the sheeting material (60) is preferably substantially covered by the covering material (90), which is separate from the sheeting material (60), wherein the covering material (90) is permeable at least to water vapor, by composition or by design and assists in providing structural integrity to the moisture absorbing product (10).

In a further embodiment the composition of the desiccant material (40) preferably comprises a mixture of calcium chloride and one or more starches, wherein the ratio of the calcium chloride to the starch minimizes the quantity of liquid water that is produced within the moisture absorbing product over a broad range of relative humidities.

BRIEF DESCRIPTION OF THE DRAWINGS

This invention is now directed with reference to the accompanying drawings in which.

DETAILED DESCRIPTION OF THE PREFERRED EMBODIMENT

Figure 1:
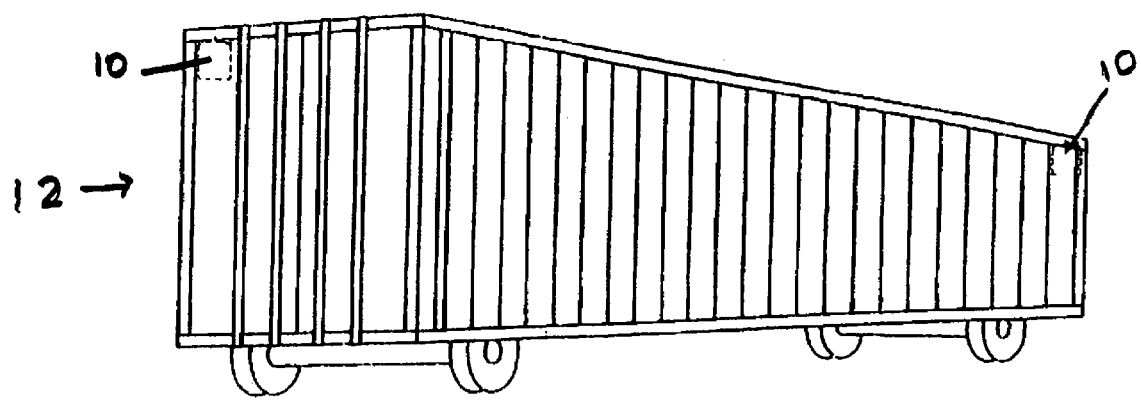
FIG. 1 is a perspective view of the moisture absorbing product placed within a container.

Although the invention is adaptable to a wide variety of structures and uses, it is shown in the drawings and described in this detailed description as embodied in a moisture absorbing product (10) for absorbing and immobilizing water, most preferably water vapor, particularly for use in containers (12), such as shipping containers and railcars, as shown in FIG. 1. This product (10) can also be used to absorb other compositions than water, such as a wide range of gases, including but not limited to, oxygen and/or ethylene. One modification needed for such alternative uses is to adjust the composition of the absorbing material contained in the desiccant container (20) to preferentially absorb the desired gaseous composition, such as, but not limited to, oxygen or ethylene. Depending on the compositions to be absorbed, the composition of the packaging material can also be adjusted to assure that it is permeable to the composition to be absorbed. Although this container (20) is referred to as a "desiccant container", absorbance or absorbance of liquid water or water vapor is not a required attribute when the material being preferentially absorbed is other than water. However, the composition of the material contained in the packaging material can also have the function of absorbing more than one other gaseous material, such as, but not limited to oxygen and water vapor. For purposes of this disclosure, absorbents and adsorbents shall have the same, all-encompassing meaning.

Figure 3:
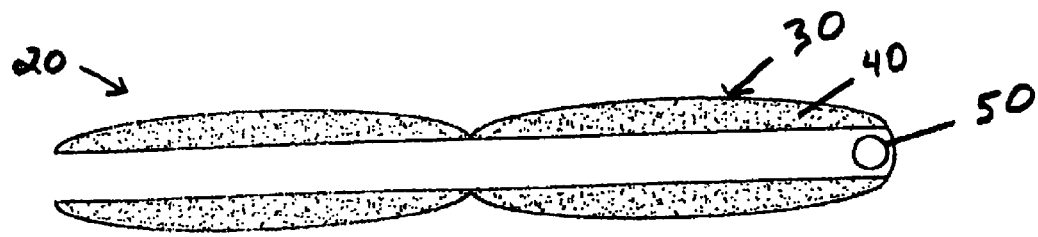
FIG. 3 is a side, end cut-away view of the desiccant container folded over the support showing the desiccant material within the desiccant holding compartments of the desiccant container.
Figure 2:
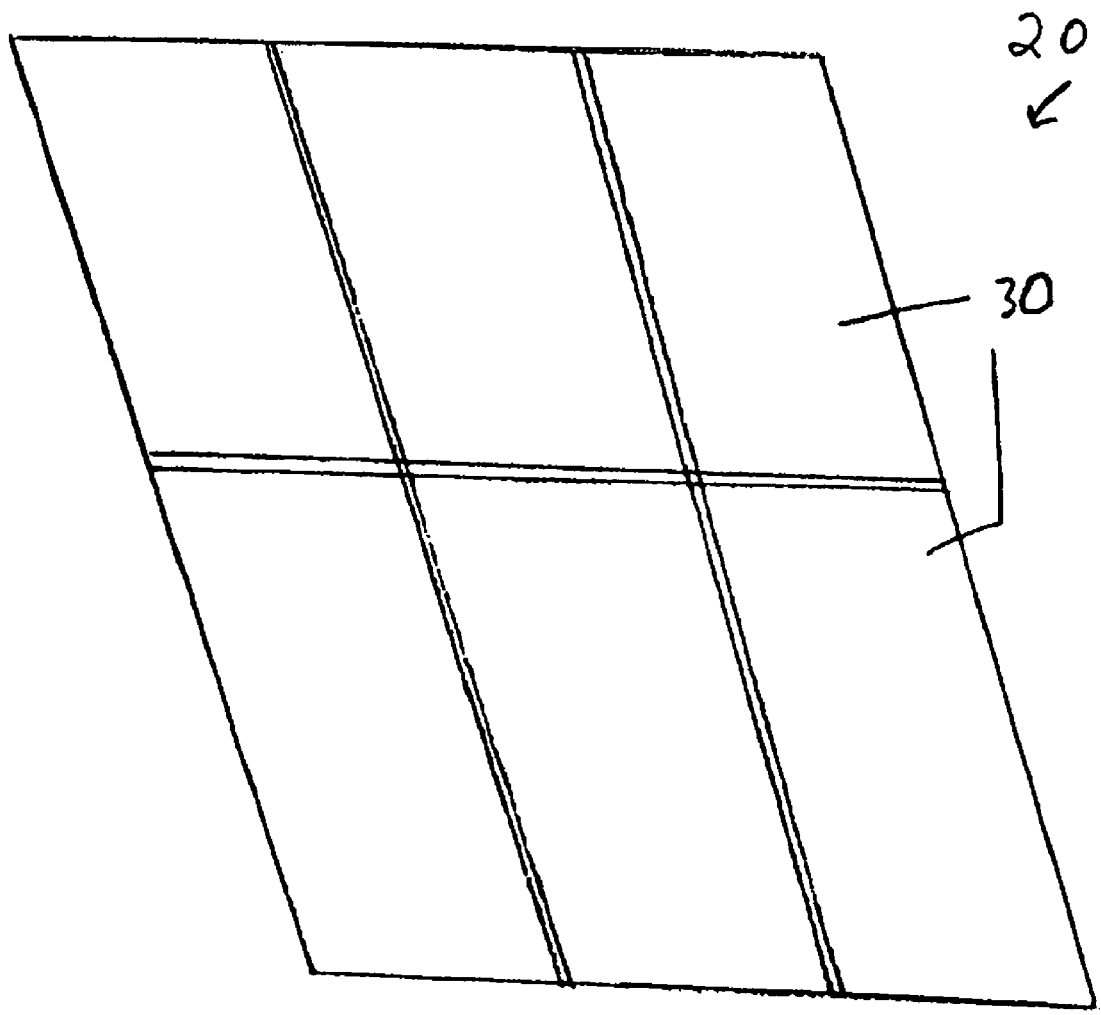
FIG. 2 is a top, perspective view of the desiccant container.

The moisture absorbing product (10) includes, but is not limited to, a desiccant container (20), which is preferably comprised of a series of desiccant holding compartments (30), each of which holds desiccant material (40), as shown in FIGS. 2 and 3. The number of compartments (30), and their location within the desiccant container (20), can be adjusted according to the needs and wishes of the consumer. In one embodiment as shown in FIG. 2, the number of desiccant holding compartments (30) comprise twelve compartments, six on one side and six on the other side of the container (20).

For ease of use, the desiccant container (20) is preferably formed in the shape of a quilted blanket, but is not limited to this shape and can also be formed into other shapes, such as a single strip pack of desiccant holding compartments (30).

Each individual desiccant holding compartment (30) contains desiccant material (40) as shown in FIG. 3. Preferably, the packaging material of these individual desiccant holding compartments (30) is permeable to water vapor but impermeable to liquid water. In one preferred embodiment the composition of these desiccant holding compartments (30) is described in detail in U.S. Pat. Nos. 5,743,942, 5,935,304 and 6,217,701, the entire contents of which are incorporated herein by reference. In this embodiment the compartments (30) consist of a laminated film layer secured to a microporous film, as discussed in these patents. These individual desiccant holding compartments (30) are joined together to form the quilt-shaped desiccant container (20), as shown in FIG. 2. Alternatively, the individual desiccant holding compartment (30) may be lined up one after the other in a strip to form a strip pack. The number of individual desiccant holding compartments (30) which are joined to form the desiccant container (20) is dependent upon the desires of the consumer.

The separate desiccant holding compartments (30) can be joined together by any conventional binding procedures, such as by adhesively sealing or heat sealing the edges of the individual desiccant holding compartments (30) together to form the desiccant container (20).

By utilizing a number of individual desiccant holding compartments (30), each holding a predetermined quantity of desiccant material (40), the desiccant material does not congregate at the bottom of the desiccant container (20). Further, this structure, utilizing a series of desiccant holding compartments (30), minimizes the overall stress on the seals of the desiccant container (20) and increases the overall absorbency of the desiccant material (40) contained in the moisture absorbing product (10) by increasing the surface area of the desiccant material (40) that is exposed to water vapor that enters the moisture absorbing product (10).

Figure 4:
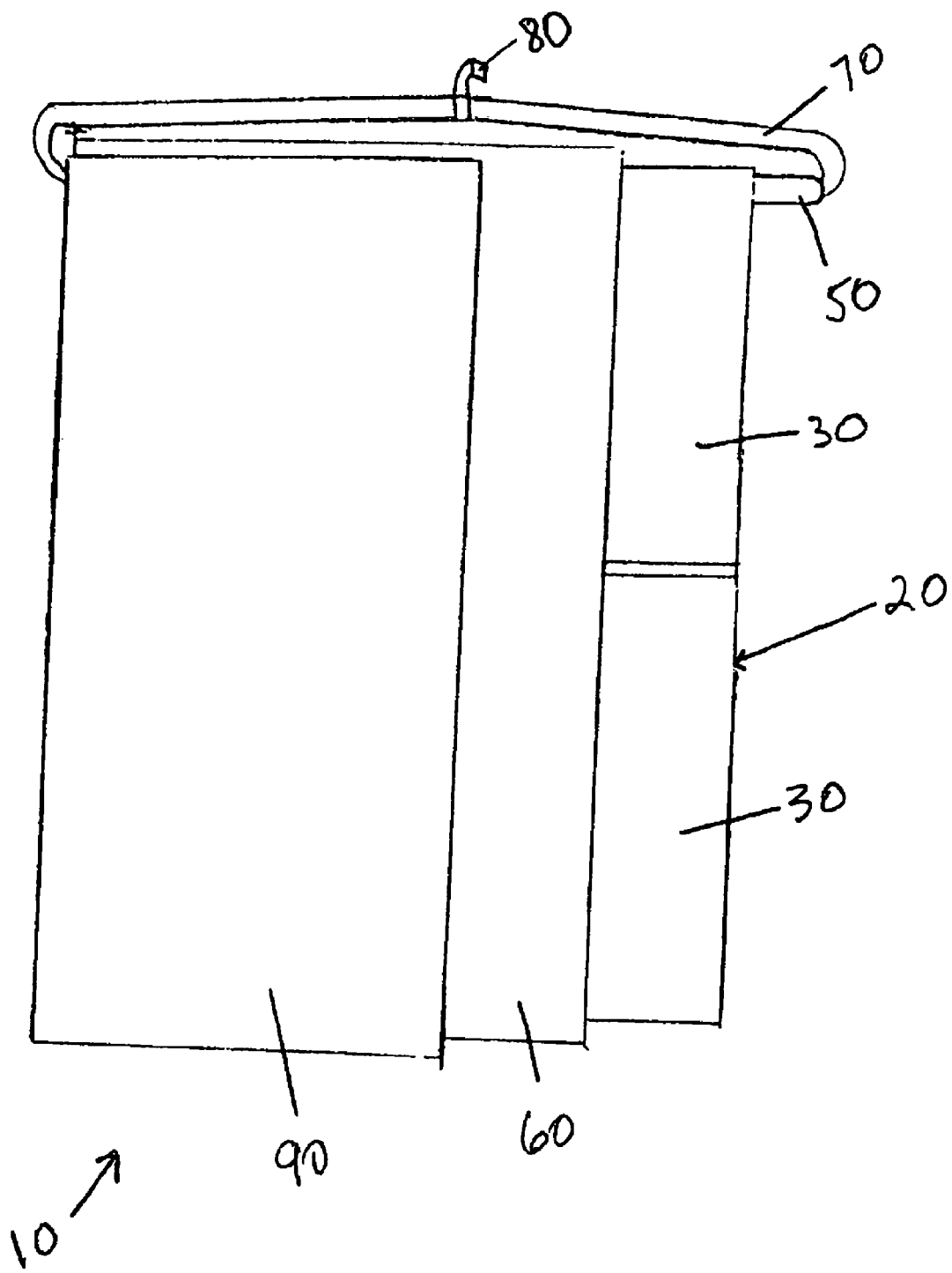
FIG. 4 is a partially cut-away top view of the moisture absorbing product.
Figure 5:
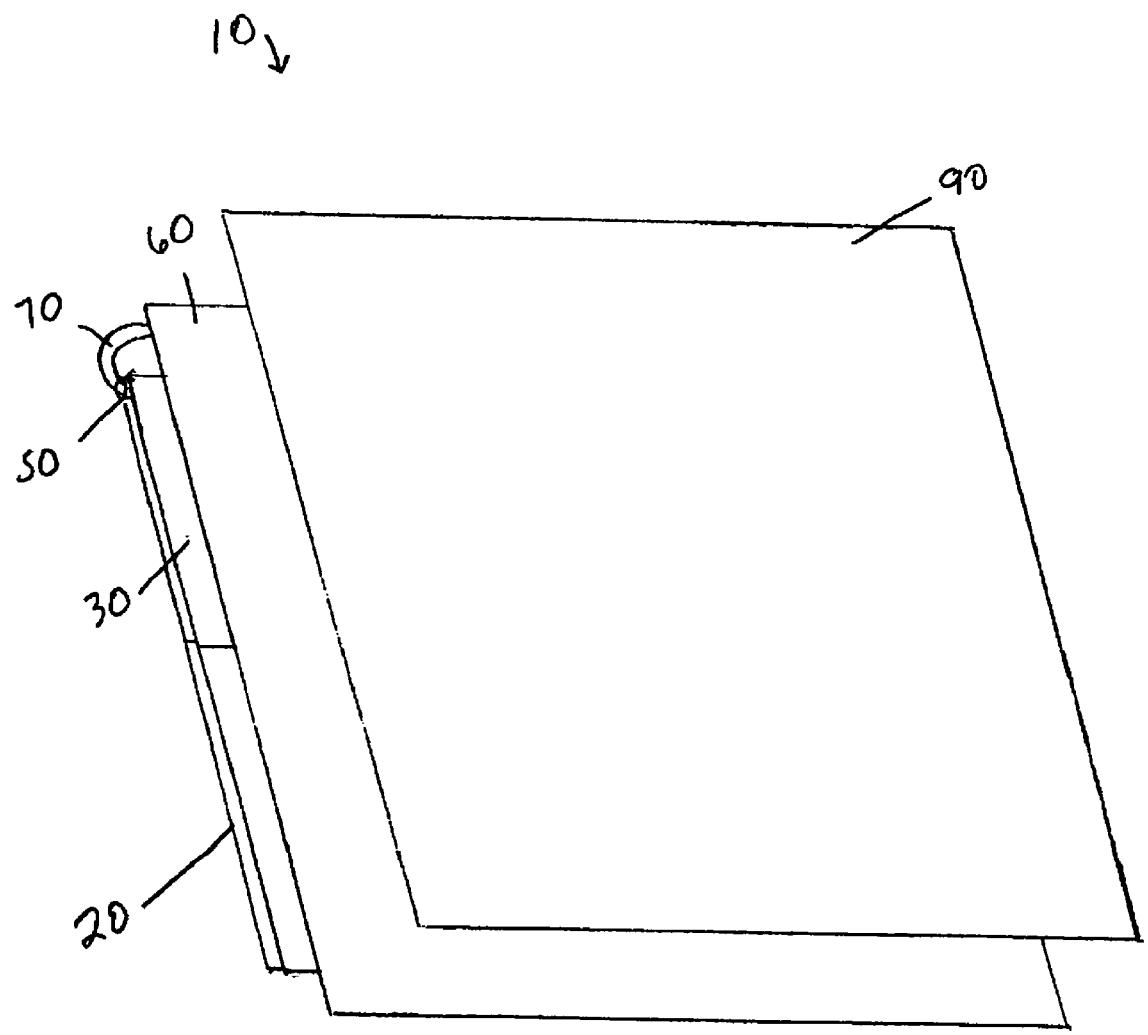
FIG. 5 is a partially exploded perspective view of the moisture absorbing product.

In one preferred embodiment, the quilt-shaped desiccant container (20) with compartments (30) is draped over, around, through or is attached to the support (50), as shown in FIGS. 4 and 5. In one particularly preferred embodiment, the support (50) is a tubular product of any convenient size, length or shape and is preferably made of a sturdy polyolefinic material, such as polyethylene. Although the size, shape and overall structure of the support (50) can be varied, in a preferred design the support (50) extends substantially from one side to an other side of the moisture absorbing product (10) and is preferably located near an edge thereof as shown in FIG. 4. The support (50) can also be produced from webbing, cable, rivets or other compositions as long as it has sufficient structural integrity to support the moisture absorbing product (10) within the container. In one preferred embodiment the support (50) is approximately the width of the moisture absorbing product (10), and is contained within the moisture absorbing product (10) near its edge, as shown in FIGS. 4 and 5. In an alternative preferred embodiment, the support (50) comprises two or more rivets secured to an edge of the desiccant container (20) to which a strap (70) or hooks (80) can be secured. The strap (70) and hooks (80) are discussed in more detail later in this disclosure.

The desiccant holding compartments (30) of the desiccant container (20) may be secured to the support (50), if desired, by conventional securing means, or they may merely be draped over the support (50). The number of desiccant compartments (30) of the desiccant container (20) which are placed on each side of the support (50) is at the discretion of the consumer. In one preferred embodiment half of the desiccant holding compartments (30) of the desiccant container (20) are draped over one side of the support (50) with the other half are draped on the opposite side of the support (50).

Substantially or wholly surrounding the desiccant container (20) with desiccant holding compartments (30) is a sheeting material (60), as shown in FIGS. 4 and 5. This sheeting material (60) substantially covers the desiccant holding compartments (30) and the support (50), if one is used. This sheeting material (60) is permeable to water vapor but substantially impermeable to liquid water through composition or design. Thus, this sheeting material (60) permits water vapor to pass freely through pores therein where that water vapor contacts the desiccant holding compartments (30) to be absorbed by the desiccant material (40) contained within the desiccant holding compartments (30). However, liquid water that might be produced within the desiccant holding compartments (30) and that escapes those compartments is substantially retained within the moisture absorbing product (10) by this sheeting material (60). The composition of the sheeting material can be any material which accomplishes the desired intent of being permeable to gaseous water but substantially impermeable to liquid water. In one preferred embodiment this material is a polyolefinic microporous material. This material may constitute a single microporous layer, a laminate of microporous layers, or a coextruded non-woven film. (For purposes of this disclosure, the term microporous means a material which is substantially gaseous water permeable and at least substantially liquid water impermeable at normal atmospheric pressure.) Preferably, the film is a single layer, microporous film formed from a polyolefinic material, such as polyethylene, polypropylene, poly(fluorinated ethylene), ethylene vinyl acetate, ethylene acrylic ester and the like. The material may be prepared by any conventional process including cold orientation of the film, orientation of different substance-containing films, extraction of different substances from different substance-containing films, extraction of different substance-containing film followed by orientation of the treated film, cross-dispersing of a bundle of fibers followed by heat-pressing the resulting film and any other conventional procedures utilized for the formation of a microporous film. Many such materials are commercially available and are sold, for example, under the names Celgard® (Hoechst Celanese Corporation), GORE-TEX® (Gore & Co. Gmbh) and Tyvek® (E.I. DuPont). The preferred microporous film has a Gurley-type air permeability of about 0.01 to 10,000 sec./100 millimeters, preferably 1 to 1,000 second/100 millimeters and most preferably less than about 400 seconds/100 millimeters. Preferably, the material is a polyethylene or polypropylene-based microporous film and most preferably a polyethylene spun-bonded paper, such as Tyvek® 1059B or 1037B, manufactured by E.I. DuPont, or a polypropylene based film, such as GDT II or GDT IV manufactured by San Ai, Ltd. of Osaka, Japan.

Figure 6:
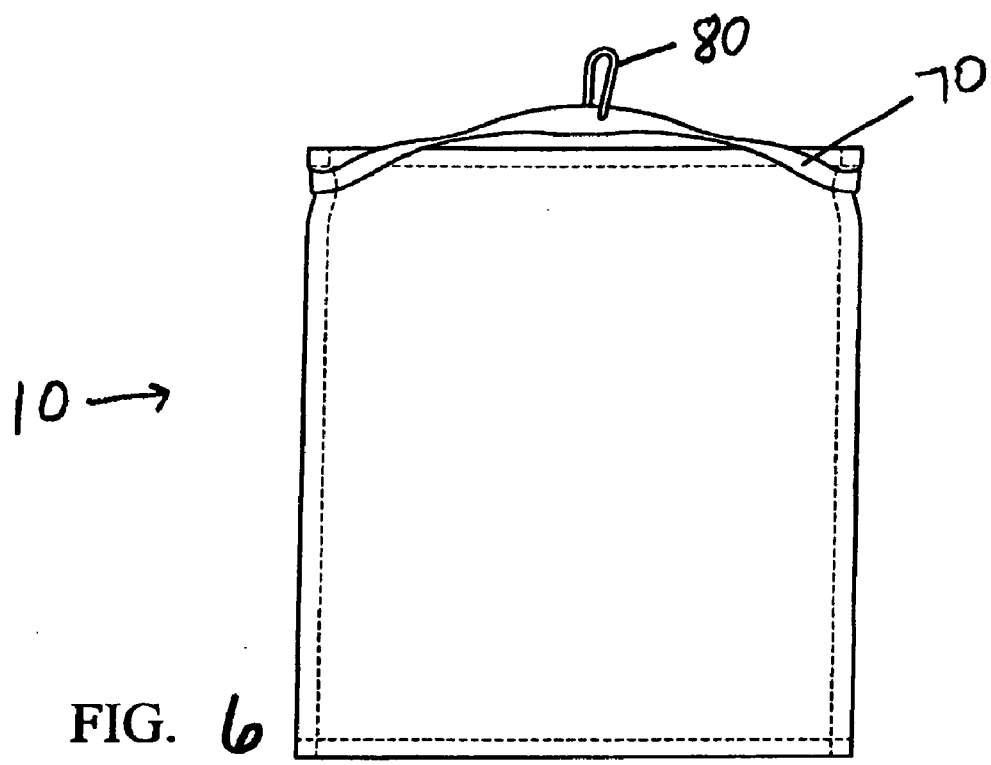
FIG. 6 is a side view of the moisture absorbing product of the invention with a single continuous strap and single hook attached thereto.

Secured to, passing within, or partially placed within the support (50) and/or secured to the desiccant container with rivets (20) is the strap (70), or other similar holding product, which strap (70) is used to attach the moisture absorbing product (10) to a wall of the container (12), as shown in FIGS. 4-6. This strap (70) permits the moisture absorbing product (10) to be placed at a desired location within the container (12) as the container is being transported. This strap (70) can be formed of any sturdy material, such as a heavyweight polypropylene, nylon or heavy-duty cord. The particular method of attaching the strap (70) to the desiccant container (20) and/or the support (50) is not critical. In one embodiment the strap (70) is secured to the desiccant container (20) itself, for example, by sealing or stitching it against an outside seam of the moisture absorbing product (10), as shown in FIG. 6 or by securing it with rivets to the container (20). The strap (70) may be a single, continuous strap which extends through the desiccant holding container (20), as shown in FIG. 4. In this embodiment the strap (20) passes through, or is attached to, the support (50) to assist in holding the moisture absorbing product (10) in the correct position within the container (12). The method of attachment and the location of the attachment of the strap (70) to the moisture absorbing product (10) is not critical.

One of the purposes for utilization of the support (50) is to provide lateral support for the moisture absorbing product (10) so that the weight of the desiccant material present in the compartments (30) does not cause the desiccant material (40) contained in the desiccant holding compartments (30) to bow towards the center when the moisture absorbing product (10) is hung within the container (12). The method of securing the strap (70) to the moisture absorbing product (10), while not particularly critical, can optimize the surface area exposure of the desiccant material. Thus, the method of securing the strap (70) to the moisture absorbing product (10) is not critical as long as it assists in achieving the goal of allowing the desiccant container (20) to hang within the moisture absorbing product (10).

Figure 7:
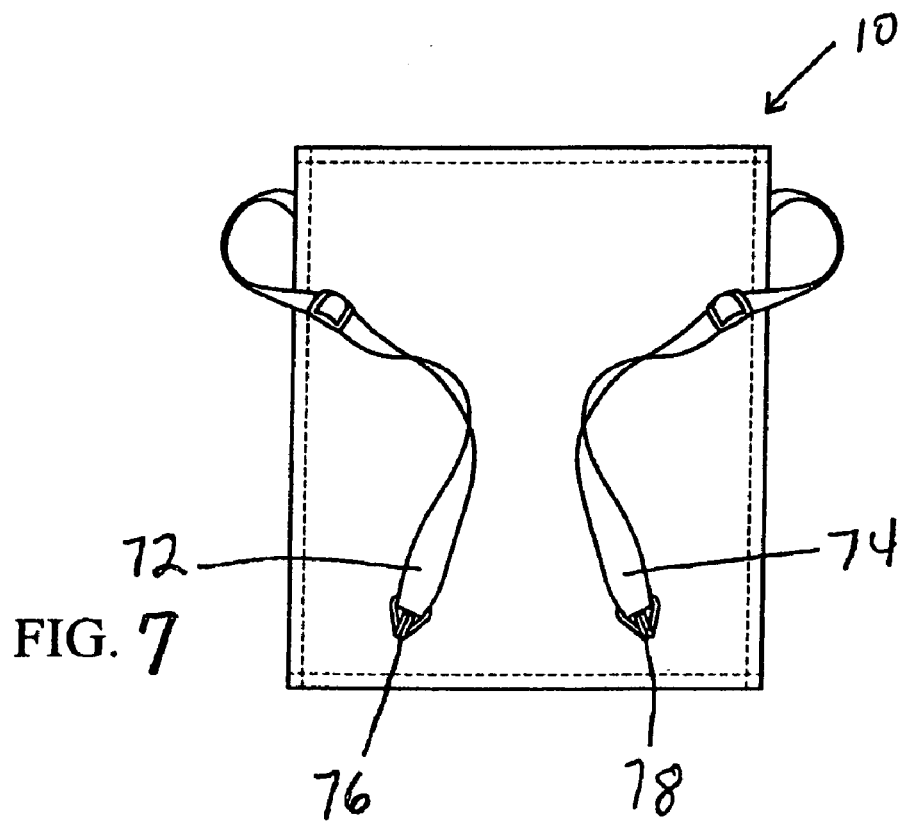
FIG. 7 is a side view of the moisture absorbing product of the invention with a single strap containing a pair of ends, each with a hook.

The strap (70) may be a continuous strap running, for example, through the support (50) as discussed above. The overall length of the strap can also be adjustable, if desired. In one embodiment, a single strap (70) with a pair of ends (72, 74) can be secured to outside edges of the moisture absorbing product (10), as shown in FIG. 7. In this embodiment separate hooks (76, 78) are secured to the ends of the strap (70). These hooks (76, 78) can be used to hang the moisture absorbing product (10) within the container (12). In a further embodiment two separate straps (not shown) can be secured to opposite sides of the moisture absorbing product (10) with one strap secured to one side of the moisture absorbing product (10) and/or to the support (50) and the other strap (74) secured to the other side of the moisture absorbing product (10).

The number of straps (70), their location on and/or in the moisture absorbing product (10), their method of attachment to the container (12), and the number of ends of those straps is not critical as long as the moisture absorbing product (10) does not hang down too far within the container (12), thus, swinging an undesirable amount when the container is in motion. In a preferred embodiment, the moisture absorbing product (10) hangs down no more than about four to ten inches (10-25 cm.) within the container (12).

To assist in the attachment of the strap (70) within the container (12), preferably a hook (80) is attached or placed on or over the strap (70), as shown in FIGS. 4 and 6. The hook (80) may be secured to the strap (70) or it may move freely on the strap (70). Alternatively, one or more hooks can be secured to or attached to the desiccant container (20) or to the covering material (90) directly thus eliminating the need for a strap. The particular form of the hook (80) is not critical. One particularly preferred type of hook is a carabiner-type hook, as shown in FIG. 6, but the type of hook is not limited. A J hook or other type of hook can also be used. The use of a carabineer-type hook limits the likelihood that the hook becomes unattached from the container (12) while the container is in motion. Alternatively, when two straps are used or when two ends of one strap are exposed, more than one hook may be used, as shown in FIG. 7.

In a preferred embodiment, the sheeting material (60) is further covered by a covering material (90), as shown in FIGS. 4 and 5. This covering material (90) can be comprised of a film, sheet, fabric, cardboard or other such material. The use of cardboard is a preferred embodiment. As stated above the sheeting material (60) substantially prevents any liquid water contained within the moisture absorbing product (10) from escaping and possibly damaging either the commercial products contained within the container (12) or the container (12) itself. The covering material (90) provides additional structural support for all components of the moisture absorbing product (10). In one alternative preferred embodiment, the sheeting material (60), the covering material (90) and one or more hooks (80) may be secured together. Further, in this embodiment they may be no strap (70) secured to the moisture absorbing product (10). The required characteristics of this covering material (90) are not critical other than it must be permeable to gaseous water based on composition or design. Preferably, this covering material (90) also has high strength and is resistant to chemicals. The composition of the covering material (90) should also be chosen such that printing, for example to disclose the composition of the desiccant materials (40) contained within the moisture absorbing product (10) and the operating characteristics of the moisture absorbing product (10), can be placed on the covering material (90). In one preferred embodiment the covering material (90) is comprised of a spun-bonded polyester material, such as REEMAY® fabrics.

In one embodiment the covering material (90) is secured to the edges of the sheeting material (60). In this embodiment the strap (70) is also preferably secured to the edges of the covering material (90) as shown in FIG. 6.

Suitable materials for use as the desiccant material (40) to be incorporated within the desiccant container (20), as shown in FIG. 3, include conventional desiccating materials such as silica gel, clays, natural or synthetic zeolites, calcium chloride, alkali metal carboxylate salts of starch-polyacrylonitrile, sodium polyacrylate, various deliquescent salts, wherein the anions include nitrate, nitrite, chloride, bromide, fluoride, sulfate, sulfite, thiosulfate, carbonate, carboxylate, phosphate and iodide and wherein the cations include ammonium, alkali, alkaline earth, earth and transition metals such as lithium, sodium, potassium, rubidium, cesium, magnesium, calcium, strontium, barium, aluminum, zinc, and iron and other desiccating products that absorb, gel or thicken upon contact with water or water vapor. The choice of the particular desiccating material may vary depending upon the humidity applications, i.e. whether the relative humidity is less than 20% or greater than 20%, particularly if the relative humidity is greater than 50%.

It has been found that a preferred desiccant material can be produced from a mixture of a deliquescent salt, such as those previously discussed, particularly calcium chloride, and a modified starch most preferably a modified corn starch. Alternative starches or combinations of more than one type of starches, such as guar gum, agar, caragean, xanthan, locus bean, and tragacanthan, may also be used. The composition of this mixture is preferably from about 5% to about 95% the deliquescent salt mixed with from about 95% to about 5% of the modified starch.

The modified starches that are utilized include conventionally modified starches, oxidized starch, enzyme-converted starches and modified starches containing functional groups. The term "starch" is intended to include any member of the family of starches or mixtures of two or more starches. The modification of the starch may be chemical, such as by cross-linking or substitution, or physical, such as by granulation.

It may be necessary that the ratio of the deliquescent salt to the modified starch be adjusted to limit the quantity of liquid water that is produced during the absorption process. The quantity of liquid water that is produced is influenced by a number of factors including temperature and humidity. Thus, the quantity of the deliquescent salt that is used in relation to the modified starch may need to be adjusted depending on the relative humidity.

The process for the production of the moisture absorbing product (10) comprises a number of steps, many of which can be completed in different order. The particular process utilized to form the product (10) can thus be varied. Further, the process can be modified depending upon the materials that are chosen to be utilized to form the components of the moisture absorbing product (10). In one preferred embodiment individual desiccant holding compartments (30) for holding desiccant material (40) are formed from a microporous film, such as a microporous film, such as Tyvek®, produced by E.I. DuPont or films such as GDT I, II, or IV, produced by San Ai of Japan in a manner described in U.S. Pat. No. 5,935,304. Alternatively, these individual desiccant holding compartments can be purchased from Sud-Chemie, Inc. under the name Container Dri® II. Alternatively, a strip contained individual desiccant holding compartments can also be purchased from Sud-Chemie Inc. As stated above, the number of desiccant holding compartments (30) can be adjusted depending upon the needs of the consumer. These compartments (30) can be joined together by any conventional procedure, such as by sewing the individual compartments together or by joining them using a conventional heat sealing or adhesive sealing process. Preferably, a heat sealing process is utilized to enhance the strength of the seals between the individual compartments (30). Prior to the joining of the individual compartments (30), each compartment is filled with the desiccant material (40) with the choice of desiccant material depending upon the ultimate utilization for the product (10).

Once the individual compartments (30) are joined together to form a desiccant container (20), that container (20) is preferably secured to or placed over a support (50) in a quilt-shaped form. The support (50) can be manufactured from any material which provides lateral support for the moisture absorbing product (10). In one preferred embodiment, the support is a PVC tube of approximately 1 inch (2.5 cm) diameter running approximately the width of the moisture absorbing product (10) over which the desiccant container (20) is placed. In an alternative embodiment the support (50) comprises a series of rivets secured to an edge of the moisture absorbing product (10).

Secured over this desiccant container (20) is a sheeting material (60). Prior to, or subsequent to the placement of the desiccant container (20) over the support (50), a strap (70) is placed within, secured to, or associated with the support (50). In one embodiment the strap (70) is a continuous material onto which a hook (80) is placed. The sheeting material (60) is formed from a material which is permeable to gaseous water but impermeable to liquid water. In one preferred embodiment this material is GDT IV produced by San Ai of Japan. The sheeting material (60) can be secured over the desiccant container (20) by any conventional procedure. In one preferred embodiment the edges are sealed by a conventional stitching or a heat sealing procedure.

In a further preferred embodiment, a covering material (90) is placed over the sheeting material (60). This covering material is preferably porous and vapor permeable by composition or design. It should be sturdy with high strength and resistance to chemicals. It should have a surface which can be printed on in a manner which identifies to the consumer the product which is contained therein. One example of a preferred covering material (90) is a REEMAY® spunbond polyester product. An alternate material is cardboard. Further, this covering material (90) preferably supports the remaining contents of the moisture absorbing product (10). The covering material (90) is secured to the sheeting material (60), for example, by securing it around the edges of the sheeting material (60), either by stitching or by sealing either through heat sealing, adhesive sealing or riveting.

Secured to or through the support (50) or to the edges of the top of the moisture absorbing product (10) is the strap (70). The strap (70) permits the moisture absorbing product (10) to hang freely, preferably approximately four inches (10 cm) below the strap (50). To assist in the hanging of this moisture absorbing product (10) within the container (12), preferably a hook (80) is secured to the strap (70). Any type of hook can be utilized which assists in the hanging of the moisture absorbing product (10) within the container or railcar (12). In an alternative embodiment the hook (80) is secured directly to the covering material (90) and the desiccant container (20) and no strap (90) is utilized.

To utilize the moisture absorbing product (10), the hook (80) is secured at the desired location within the container (12). A sufficient number of moisture holding products (10) are utilized within the container (12) to maintain the moisture level at the desired relative humidity for the necessary time of shipment.

What is claimed:

1. A moisture absorbing product for use in a shipping container comprising
    a desiccant container comprising a plurality of desiccant holding compartments, each compartment containing desiccant material,
    a moisture absorbing product support, over which the desiccant container is placed,
    a sheeting material, which substantially covers the desiccant container, which material is permeable to gaseous water but impermeable to liquid water, and
    a strap secured to the desiccant container to hang the moisture absorbing product in the shipping container.

2. The moisture absorbing product of claim 1, further comprising a hook secured to the strap.

3. The moisture absorbing product of claim 1, further comprising a covering material which substantially covers the sheeting material and which covering material is permeable to gaseous water but substantially impermeable to liquid water.

4. The moisture absorbing product of claim 1, wherein the desiccant material comprises a mixture of calcium chloride and starch.

5. The moisture absorbing product of claim 1, wherein the desiccant holding compartments are permeable to water vapor but substantially impermeable to liquid water.

6. The moisture absorbing product of claim 1, wherein the desiccant container comprises a quilted blanket of desiccant holding compartments.

7. The moisture absorbing product of claim 1, wherein the desiccant container comprises a strip of desiccant holding compartments.

8. The moisture absorbing product of claim 1, wherein the moisture absorbing product support comprises a tubular product which extends substantially from one side to an other side of the moisture absorbing product.

9. The moisture absorbing product of claim 1, wherein the strap is adjustable in length.

10. The moisture absorbing product of claim 3, wherein the strap is also secured to the covering material.

11. A process for production of a moisture absorbing product comprising
    preparing a desiccant container comprising a plurality of desiccant holding compartments, wherein said desiccant holding compartments are secured together,
    placing a support adjacent to the desiccant container,
    placing a sheeting material substantially over the desiccant container,
    securing a strap to the sheeting material or the support, and
    placing a hook onto the strap.

12. The process of claim 11, further comprising securing a covering material substantially over the sheeting material.

13. A moisture absorbing product for use in a shipping container comprising
    a desiccant container comprising a plurality of desiccant holding compartments, each compartment containing a desiccant material,
    a moisture absorbing product support, which provides support for the desiccant container,
    a sheeting material, which substantially covers the desiccant container, which material is permeable to gaseous water but substantially impermeable to liquid water,
    a covering material, which substantially covers the sheeting material, and
    a hook secured to the desiccant container or the covering material.

14. The moisture absorbing product of claim 13, wherein the desiccant material comprises a mixture of calcium chloride and starch.

15. The moisture absorbing product of claim 13, wherein the desiccant container comprises a quilted blanket of desiccant holding compartments.

16. The moisture absorbing product of claim 13, wherein the desiccant container comprises a strip of desiccant holding compartments.

17. The moisture absorbing product of claim 13, wherein the moisture absorbing product support comprises a tubular product, which extends substantially from one side to an other side of the moisture absorbing product.

18. The moisture absorbing product of claim 13 further comprising a strap secured to the desiccant container or the covering material.

* * * * *